Figures 1, 2:
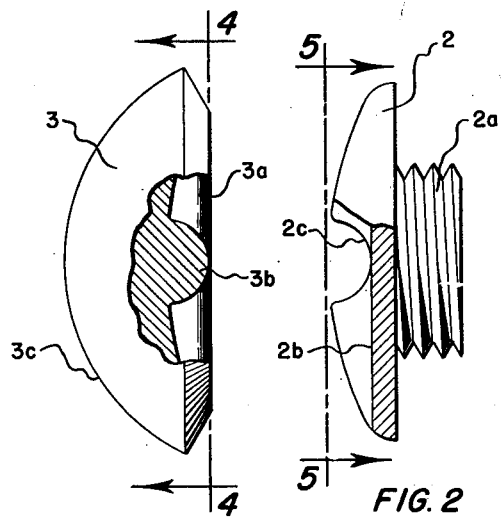

Oct. 23, 1951            J. H. WILSON            2,572,416
ARTIFICIAL EYE COMPRISING AN EYE IMPLANT AND A CONNECTING
SUPPORT FOR AN EYE-SIMULATING MEMBER
Filed June 30, 1947

*INVENTOR.*
JOSEPH H. WILSON
BY
*Wm. H. Dean*
AGENT

Patented Oct. 23, 1951

2,572,416

UNITED STATES PATENT OFFICE 2,572,416

ARTIFICIAL EYE COMPRISING AN EYE IMPLANT AND A CONNECTING SUPPORT FOR AN EYE-SIMULATING MEMBER

Joseph H. Wilson, La Mesa, Calif.

Application June 30, 1947, Serial No. 758,090

6 Claims. (Cl. 3—13)

My invention relates to an artificial eye comprising an eye implant and a connecting support for an eye-simulating member, more particularly to an eye implant and support which, after being implanted and sutured to the muscles, activates the artificial eye in unison with the remaining natural eye. The objects of my invention are:

First, to provide an implant and connection which actuates an artificial eye in a substantially natural manner whereby almost complete natural appearance and movement of an artificial eye may be obtained.

Second, to provide an artificial eye comprising an eye implant and a connecting support for an eye-simulating member which is directly connected to the original muscles of the natural eye removed prior to installation of the artificial eye implant.

Third, to provide an artificial eye implant and support having an implant made of certain materials so constructed that the tissue and other parts adjacent the eye will grow into and around said implant making it an integral part of the eye socket.

Fourth, to provide an artificial eye comprising an eye implant and a connecting support for an eye-simulating member having an implant which provides a substantially floating arrangement of the eye in the socket whereby the slight pressure of the eyelid on the outer surface of the eye holds the same backwardly against the implant cap.

Fifth, to provide an artificial eye of this class which bears substantially at the middle portion thereof against the implant at the back side of said artificial eye relieving the bearing at the back side of the eye outwardly of said implant.

Sixth, to provide an artificial eye comprising an eye implant and a connecting support for an eye-simulating member which is very easy to install.

Seventh, to provide an artificial eye comprising an eye implant and a connecting support for an eye-simulating member having an implant provided with muscle connection portions almost identical in position to those of the original eye.

Eighth, to provide an artificial eye comprising an eye implant and a connecting support for an eye-simulating member which provides muscular exercise of the remaining portions of the socket and eye actuation muscles, preventing the same from going dormant whereby natural appearance of the eye socket is maintained.

Ninth, to provide an artificial eye and support therefor having an implant in which a connecting cap is screw threaded completely enclosing the outer face of the socket whereby growth of the eye socket does not interfere with the installation or actuation of the artificial eye in connection with the implant.

Tenth, to provide an artificial eye and support therefor having a positive activating mechanism for moving the artificial eye in a variety of directions within the capabilities of the muscles of the natural eye, and Eleventh, to provide an artificial eye and support therefor which is very simple and economical of construction, efficient in operation, and which will not readily deteriorate or get out of order.

Figure 3:
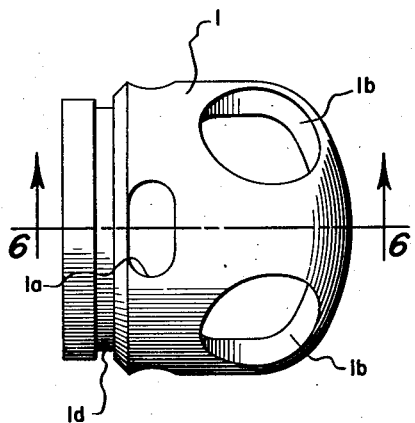
Figure 4:
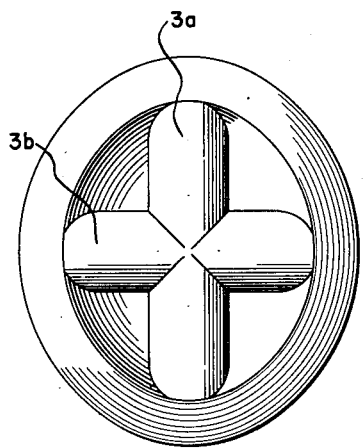
Figure 5:
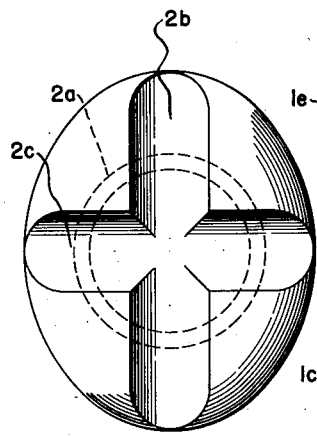
Figure 6:
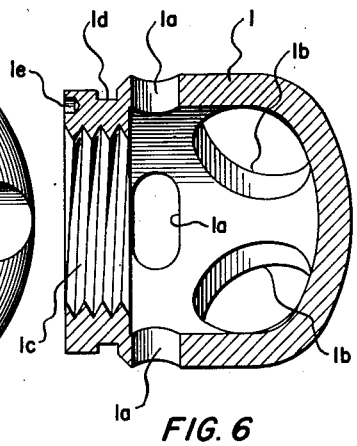

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is an edge elevational view of my artificial eye showing portions thereof broken away and in section to amplify the illustration. Figure 2 is an edge elevational view of the implant cap of my artificial eye implant and support therefor showing portions thereof broken away and in section to amplify the illustration. Figure 3 is a side elevational view of the implant of my artificial eye and support therefor. Figure 4 is a rear elevational view of my artificial eye taken from the line 4—4 of Figure 1. Figure 5 is a front elevational view of the cap as shown in Figure 2 of the drawings taken from the line 5—5 of Figure 2, and Figure 6 is a sectional view taken from the line 6—6 of Figure 3 showing internal details of the implant of my artificial eye implant and support therefor.

The implant 1 is a cup-shaped member preferably made of plastic material, tantalum or any other suitable material as desired. This implant 1 is provided with muscle connection openings 1a arranged to receive the ends of the natural eye muscles which have been cut loose from the original natural eye. These openings 1a are substantially 90 degrees apart as shown in Figure 6 of the drawings and communicate with the interior of the implant which is also provided with openings substantially 45 degrees from the openings 1a rearwardly thereof designated 1b which openings 1b provide for growth of the socket around and into the implant after it has been installed. Inwardly of the open end of the implant 1 is provided an internally screw threaded portion 1c arranged to receive the externally screw threaded plug portion 2a of the cap 2. Surrounding the screw threaded portion 1c is a recessed annular groove 1d arranged to receive a portion of the conjunction held by a purse string suture enclosing the socket of the original natural eye about the periphery of said implant 1. In the end of the implant 1 is provided an indexing recess 1e arranged to indicate the placement of the cap 2 and the implant 1 relatively to the normally vertical axis of the person's face in which the implant 1 is installed. The screw-threads 1c and 2a orientate the cap 2 with the groove 2c vertically disposed, and the groove 2b horizontally disposed, whereby the index 1e is maintained vertical when the screw-threads 1c and 2a are tightly engaged. The front side of the cap 2 is provided with crossed recess portions 2b and 2c. The recess portion 2b is normally arranged to be in horizontal position while the recess portion 2c is arranged to be in vertical position when installed. The rear side of the artificial eye 3 is provided with cross projecting portions 3a and 3b arranged to fit in the recess portions 2b and 2c respectively of the cap 2. Slight pressure of the eyelid on the outer contour 3c of the artificial eye 3 holds the cross projecting portion 3a and 3b in the recess portions 2b and 2c respectively of the cap 2.

The operation of my artificial eye and support therefor is substantially as follows:

The implant 1 is first installed in the eye socket after the original natural eye has been removed. The indexing portion 1e of the implant 1 is placed at the top of the eye socket and the four muscles removed from the original natural eye are drawn through the openings 1a in the implant 1 and are tied together at the middle thereof where they grow together. The conjunctiva of the eye is drawn around the annular groove 1d and secured therearound with a pursestring suture. The tissues then grow through the openings 1b and completely fill the inside of the implant 1. After a few weeks the implant 1 becomes an integral part of the eye socket. As soon as the conjunctiva is sutured the cap 2 is screwed into place in the implant 1 wherein the screw threads 2a engage the screw threads 1c. As the cap 2 is tightened it automatically indexes with the recess index 1e due to its precisely machined arrangement. As hereinbefore described the widest portion of the cap on an axis with the recess portions 2b is placed horizontally and this cap will, after being tightened in place in connection with the implant 1, remain in fixed relationship to the socket of the original eye. In this manner the cap 2 will always remain outside the conjunctiva and the recessed crossed connections engaged by the projecting crossed connections of the artificial eye permit the muscles of the socket in connection with the openings 1a of the implant 1 to move the artificial eye 3 in any direction within the capabilities of the muscles actuating the remaining natural eye. It will be noted that after the implant has been installed and as soon as the stitches are removed from the socket the artificial eye may be installed. It may be a blank eye when first installed until such time as the finished matched eye is complete. The engagement of the eyelid with the outer surface 3c of the artificial eye maintains the same in its connected relationship with the cap. Thus the artificial eye is a substantially floating structure and the bearing thereof is entirely on the cap at the rear side thereof which permits the muscles connected to the implant 1 to actuate the artificial eye 3 in an almost completely natural manner. Actuation of the implant 1, cap 2 and artificial eye 3 provides natural exercise for the eye muscles preventing the same from growing dormant thus the eye socket is maintained in its natural form.

Though I have shown and described a particular construction, combination and arrangement of parts and portions, I do not wish to be limited to this particular construction, combination, and arrangement, but desire to include in the scope of my invention the construction, combination and arrangement substantially as set forth in the appended claims.

Having thus described my invention, what I claim as new and desire to secure by Letters Patent is:

1. In an artificial eye comprising an eye implant and a connecting support for an eye-simulating member, a substantially hollow cup-shaped implant having four holes therein adapted to receive natural eye muscles after they have been removed from the original eye, said implant having an annular groove therein surrounding the same forwardly of said openings for receiving said muscles arranged to support a pursestring suture for connecting the conjunctiva of the eye.

2. In an artificial eye comprising an eye implant and a connecting support for an eye-simulating member, a substantially hollow cup-shaped implant having four holes therein adapted to receive natural eye muscles after they have been removed from the original eye, said implant having growth holes rearwardly of said holes for receiving said muscles.

3. In an artificial eye implant and support therefor, an implant member having means for connection of the natural eye muscles thereto, said member having an internally screw-threaded portion and a cap having an externally screw-threaded plug adapted to be inserted in said internally screw-threaded portion of said implant, said cap having connection means for supporting an artificial eye.

4. In an artificial eye implant and support therefor, an implant member having means for connection of the natural eye muscles thereto, said member having an internally screw-threaded portion and a cap having an externally screw-threaded plug adapted to be inserted in said internally screw-threaded portion of said implant, said cap having connection means for supporting an artificial eye, said connecting means in the form of crossed recess portions.

5. In an artificial eye implant and support therefor, an implant member having means for connection of the natural eye muscles thereto, said member having an internally screw-threaded portion and a cap having an externally screw-threaded plug adapted to be inserted in said internally screw-threaded portion of said implant, said cap having connection means for supporting an artificial eye, said connecting means in the form of crossed recess portions, an artificial eye having crossed projection portions engaging said crossed recess portions of said cap.

6. In an artificial eye implant and support therefor, an implant member having means for connection of the natural eye muscles thereto, a cap, removably connected to said implant, an artificial eye in connection with said cap, said cap and said artificial eye having intermeshing crossed projection and recess portions.

JOSEPH H. WILSON.

REFERENCES CITED

The following references are of record in the file of this patent:

UNITED STATES PATENTS

| Number | Name | Date |
| --- | --- | --- |
| 2,322,117 | Dimitry | June 15, 1943 |

FOREIGN PATENTS

| Number | Country | Date |
| --- | --- | --- |
| 19,625 | Great Britain | Nov. 1, 1892 |

OTHER REFERENCES

Ruedemann, A. D., Plastic Eye Implant-American Journal of Ophthalmology, August 1946, pages 947-952. (Copy in Div. 55.)

"A Basket Type Implant for Use After Enucleation," by N. L. Cutler, Archives of Ophthalmology, vol. 35 #2 pp. 71-83. (A copy in the Army Medical Library, Washington, D. C.)